United States Patent [19]

Finkelstein

[11] 4,303,460
[45] Dec. 1, 1981

[54] METHOD OF MAKING BAFFLED LAP WELDED WATERBED MATTRESS BAG

[75] Inventor: Alberto L. Finkelstein, Newbury Park, Calif.

[73] Assignee: Mollura Industries, City of Industry, Calif.

[21] Appl. No.: 147,234

[22] Filed: May 6, 1980

Related U.S. Application Data

[60] Division of Ser. No. 53,398, Jun. 29, 1979, which is a continuation of Ser. No. 2,024, Jan. 9, 1979, abandoned.

[51] Int. Cl.³ .............................................. B29C 19/04
[52] U.S. Cl. .................................... 156/273; 156/290; 156/380.8; 156/581; 156/583.4
[58] Field of Search ................ 156/272, 273, 380, 290, 156/292, 581, 583.1, 583.4; 5/455, 456, 458

[56] References Cited

U.S. PATENT DOCUMENTS 3,918,110 10/1975 Cantillo et al. ...................... 5/455 X
4,167,432 9/1979 Mollura .............................. 5/458 X
4,172,301 10/1979 Everard et al. ..................... 5/455 X

*Primary Examiner*—David A. Simmons
*Attorney, Agent, or Firm*—Flam & Flam

[57] ABSTRACT

Two rectangular pieces of plastic material corresponding to the top and bottom layers of the bag to be formed are placed end to end and looped to form a tube. The overlapped ends are partially welded together to leave long access slits to the tube. The incompletely formed tube is telescoped over a welding die having the same general configuration of the tube, but axially compressed. The edges of the tube openings are turned inwardly over the generally rectangular rims at opposite ends of the die. The corners of the rims are rounded so that the inwardly turned edges form a one layer continuous flange free of wrinkles. Rectangular end pieces are then lap welded to the flange. The incompletely formed waterbed mattress is removed from the die. Individual baffle structures are welded to the top and bottom layers of the bag by secondary operations in which a jig mounting a row of baffle structures projects through the tube slits to position the baffle structures during a welding operation. The jig withdraws from the now welded baffle structures. After the requisite number of rows of baffles are welded, the slits are finally closed by a lap welding process. A fully lap welded waterbed mattress bag results.

4 Claims, 7 Drawing Figures

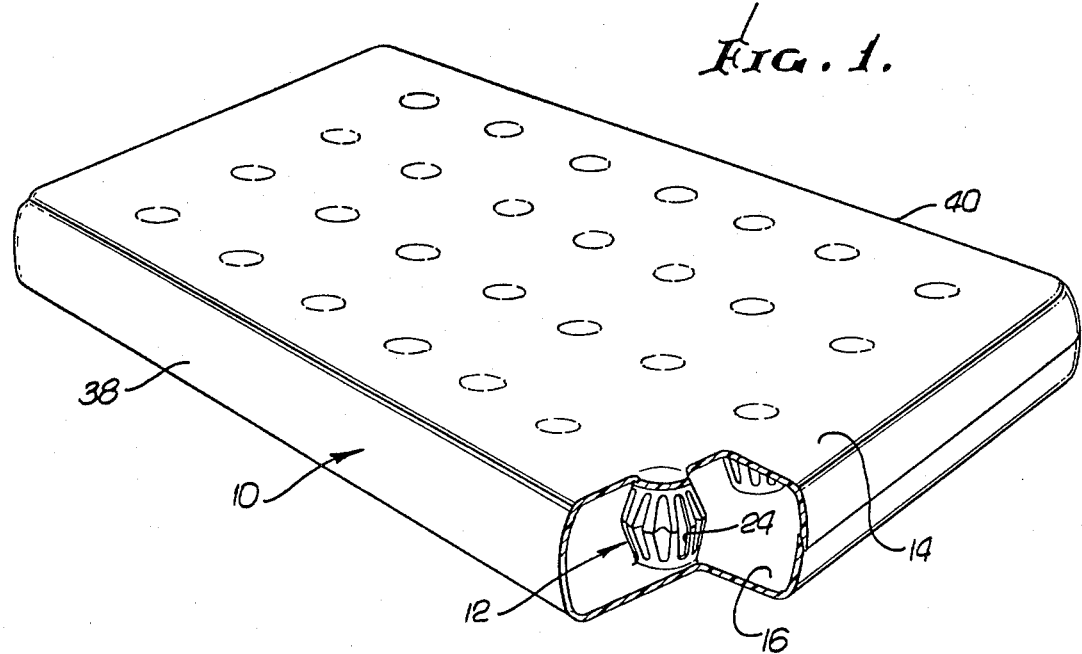
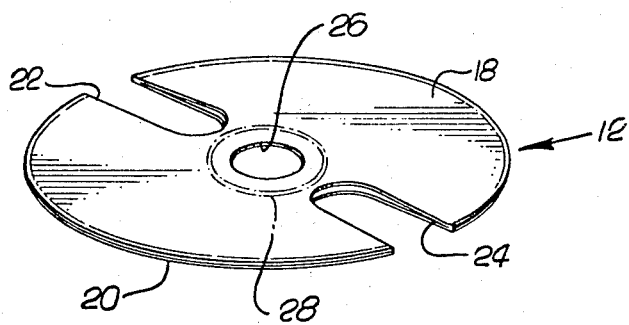
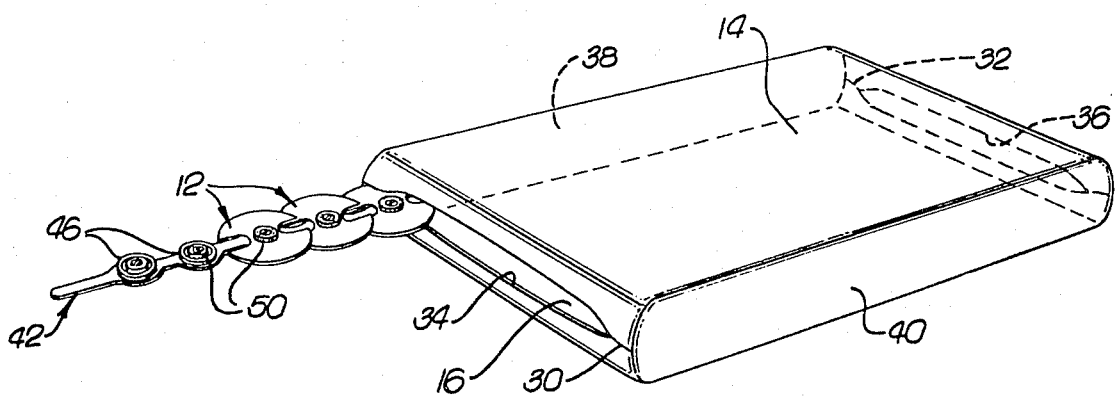

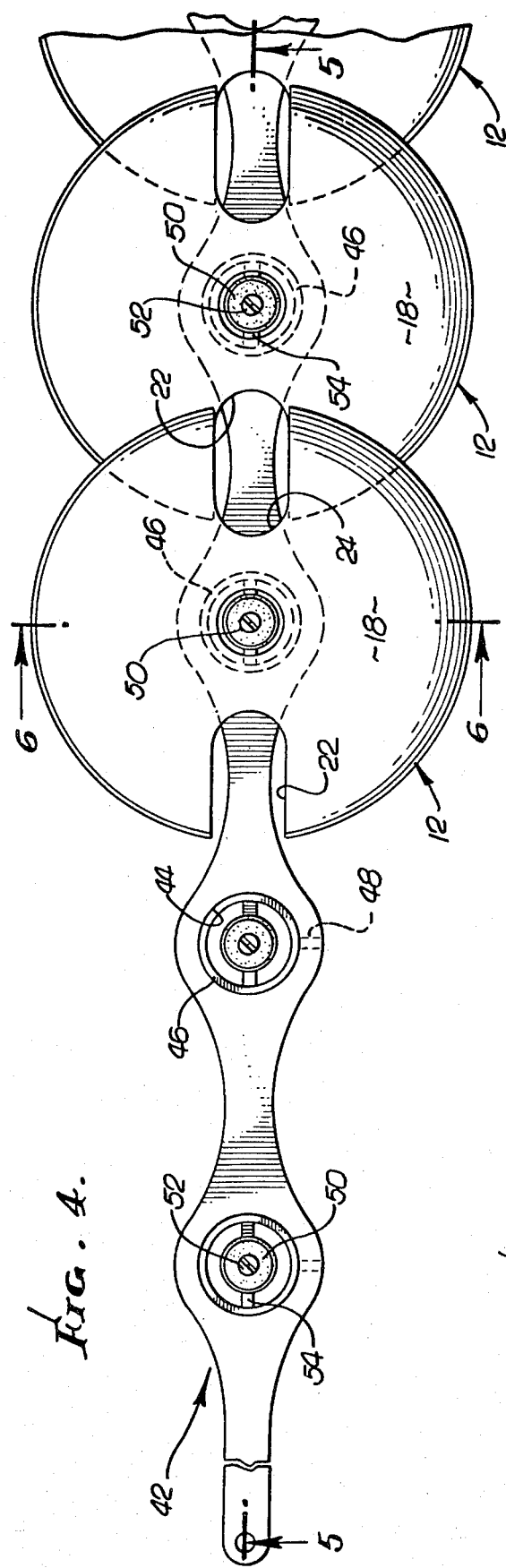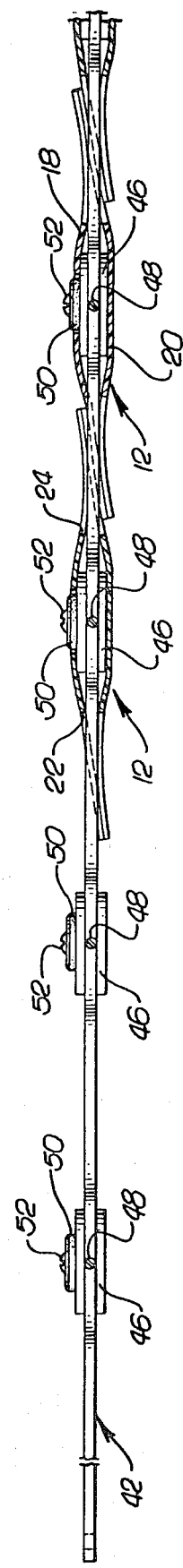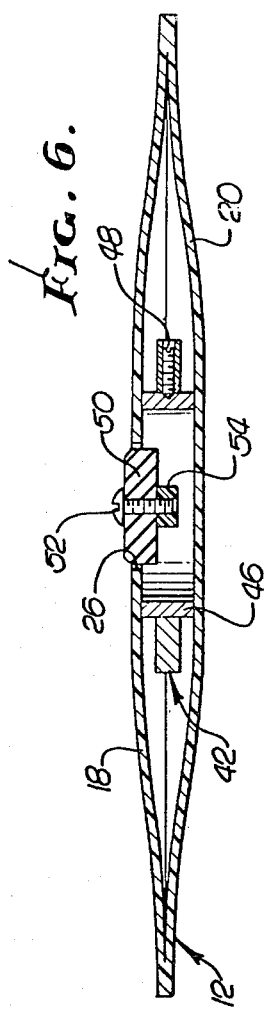

METHOD OF MAKING BAFFLED LAP WELDED WATERBED MATTRESS BAG

RELATED APPLICATIONS

This is a division, of application Ser. No. 53,398 filed June 29, 1979, which was a continuation of Ser. No. 2,024, filed Jan. 9, 1979, and abandoned June 29, 1979.

FIELD OF INVENTION

This invention relates to bags for use as waterbed mattresses. More particularly, this invention relates to a method of making a bag having interior baffle structures welded to the top and bottom layers in which the bag itself is entirely lap welded.

BACKGROUND OF THE INVENTION

When waterbeds were first popularized, the bags usually comprised two layers of plastic material peripherally butt welded together to form a simple pillow-like configuration. Later, the bags were made in a three dimensional configuration better to fit the frame to avoid abrasion and excessive fatigue.

Whether made as a simple pillow or as a more complex three dimensional structure, bags are less prone to fail if the welds are lap welds rather than butt welds. Thus, butt welds tend progressively to peel apart under internal stress and are not as strong as lap welds which utilize shear forces to resist failure. Moreover, lap welds provide no rim or flange protuberances that must fold to conform to the frame and, consequently, stress the material in so doing.

The most desirable structure is a three dimensional box-like structure that is entirely lap welded. U.S. Pat. No. 3,753,819 to Carlos A. Mollura, entitled TUBULAR FLEXIBLE BAG WITH LAP WELDED ENDS, describes a method by which such a bag may be constructed. A sheet of plastic material is looped to form a tube, the ends being partially lap welded to leave an intermediate slit. The tube is then telescoped over a floating die that has generally rectangular ends. The edges of the tube are folded inwardly to form a marginal flange. The corners of the die are slightly rounded so that bunching and overlapping is avoided. End pieces are placed over the die and welded in place. A one-to-one weld is achieved. The die is removed through the slit which is subsequently closed with the aid of a separator stick, in turn subsequently removed through the fill aperture.

It has become increasingly important to provide so-called "waveless" waterbed bags, that is, bags in which the water provides the conformable support, but does not provide extended wave motion. It has been proposed to utilize internal baffles. The problem is how to weld such baffles in position and subsequently close the mattress by a lap welded process. In U.S. patent application Ser. No. 796,853 of Carlos A. Mollura, entitled METHOD OF MAKING BAFFLED WATERBED, now U.S. Pat. No. 4,141,770, the baffles are made in companion separable parts whereby the baffles can be assembled as the last or penultimate step in the construction process, the separable baffle parts allowing the bag to be telescoped over the floating die as in U.S. Pat. No. 3,753,819. The solution is tedious and expensive.

The primary object of the present invention is to provide a simple and inexpensive method of making a waveless waterbed mattress bag, that is, one with internal baffle structures within the framework of a 100% lap welded three dimensional structure.

SUMMARY OF THE INVENTION

In order to accomplish the foregoing object, a lap welded box shaped mattress is first made essentially in accordance with the teachings of said U.S. Pat. No. 3,753,819 to Mollura. However, instead of a single sheet of plastic looped and lap welded to form a tube, two identical sheets of plastic are joined and lap welded so that the seams fall along the sides or along the head and foot. Both seams are initially incomplete so that access is later provided through the bag. The tube is then folded or telescoped over a floating die as in said U.S. Pat. No. 3,753,819 for placement of end pieces. The baffle structures comprise individual "pancakes" of the type shown and described in U.S. patent application Ser. No. 796,853 filed by Carlos A. Mollura. The pancake baffles are placed on a skewer-like jig that is passed through the bag via the slits at opposite sides. The jig includes floating die elements for welding all of the jigged baffles to the top and bottom bag layers. Registers ensure proper placement relative to ring-like die members. After the pancake baffles are welded in place, the jig is withdrawn. Rows of baffles are successively welded until the requisite number of rows are provided. As a last step, the slits in the mattress are closed, completing the 100% lap welded structure.

BRIEF DESCRIPTION OF THE DRAWINGS

A detailed description of the invention will be made with reference to the accompanying drawings wherein like numerals designate corresponding parts in the several figures. These drawings, unless described as diagrammatic or unless otherwise indicated, are to scale.

FIG. 1 is a perspective view of a waterbed mattress bag made in accordance with the present invention, a corner of the bag being broken away and shown in section.

FIG. 2 is a perspective view of one of a number of identical baffle elements used in the construction of the bag of FIG. 1.

FIG. 3 is a perspective view illustrating diagrammatically, the use of a jig for placement of baffles inside the bag for welding.

FIG. 4 is an enlarged fragmentary plan view of the welding jig.

FIG. 5 is a side elevational view of the welding jig, the jigged baffle elements being shown in section along a plane corresponding to line 5—5 of FIG. 4.

FIG. 6 is an enlarged transverse sectional view taken through one of the jig die elements and register.

DETAILED DESCRIPTION OF PREFERRED EMBODIMENT

Figure 7:
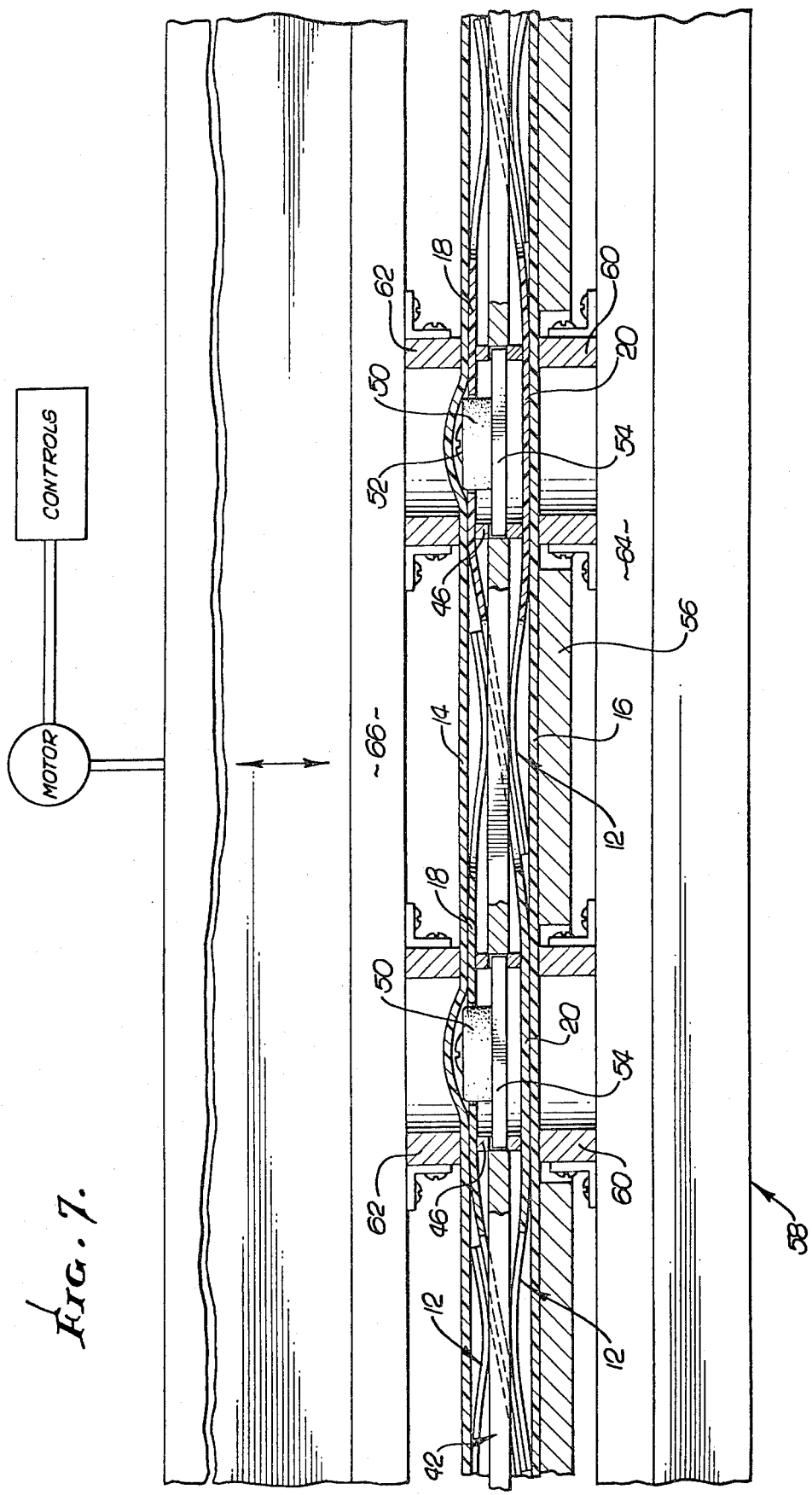
FIG. 7 is a partially diagrammatic fragmentary view illustrating the welding machine about to be closed on the jig and baffle elements.

The following detailed description is of the best presently contemplated mode of carrying out the invention. This description is not to be taken in a limiting sense, but is made merely for purposes of illustrating the general principles of the invention, since the scope of the invention is best defined by the appended claims.

The waterbed mattress bag 10 shown in FIG. 1 includes in the present instance, four rows of baffle elements 12, each individually welded to the top and bottom layers 14 and 16 of the bag. One of the baffle elements 12 is shown in FIG. 2. It comprises juxtaposed circular layers 18 and 20 peripherally welded together. Notches 22 and 24 are formed on diametrically opposite sides providing access to and through the interior. Additionally, the top baffle element 12 has a central opening 26 forming a register to be hereinafter described.

The baffle element 12 is intended to attach the top and bottom bag layers 14 and 16 by a circular weld at the region 28 shown in dotted lines in FIG. 2. The baffle element then assumes the generally biconical form shown in FIG. 1, the water in the bag flowing freely into and out of the baffle element via the notches 22 and 24.

Broadly, then, the waterbed mattress of this invention includes entirely lap welded mattress seams and a plurality of interiorly mounted bags or baffles. Each of such baffles is heat-sealed inside the mattress to two opposite walls thereof without substantially thinning or otherwise substantially weakening those walls. Typically, the two opposite walls to which the baffles are welded are the top and bottom walls of the mattress.

To obtain these interior heat seals or welds, our welding means includes a pair of platens or heads of very broad area for contact with the mattress layers. This welding apparatus is fully described in copending U.S. patent application of Carlos A. Mollura, Ser. No. 894,427, filed Apr. 7, 1978, now U.S. Pat. No. 4,167,432, and the disclosure of that application is incorporated herein in its entirety.

The "pancake" structures used in the new waterbed mattress may be the same as those disclosed in Mollura/Everard U.S. application Ser. No. 865,995, filed Dec. 30, 1977, now U.S. Pat. No. 4,172,301. The disclosure of that application is also incorporated herein in its entirety. Preferably, the pancake bladders used here have an axial extension limit which is greater than the maximum desired separation distance between the walls to which the bladders are attached. When the mattress is filled to the maximum suggested extent, these bladders will not extend to their maximum axial limit. They will extend axially sufficiently to assume a biconical, convoluted shape. But they will exert substantially lower stress on the welds formed between the bladder and the interior walls to which the bladders are attached than they would if fully extended between those walls. With this construction, the mattress user will truly float on the mattress surface, but will float in a controlled fashion unobtainable where no baffles are present or where baffles are present but are fully extended.

The baffle elements 12 are assembled after the boxlike mattress bag is formed as diagrammatically shown in FIG. 3. The bag, as shown in FIG. 3, is formed by partially lap welding the top and bottom layers 14 and 16 along lines 30 and 32 corresponding, in the present instance, to the head and foot of the bag. Access slits 34 and 36 are thus formed. Generally rectangular pieces 38 and 40 close the ends of the tube formed by the lap welded top and bottom layers 14 and 16. The end pieces 38 and 40 are attached by welding in accordance with U.S. Pat. No. 3,753,819, by first telescoping the tube over a floating die (not shown), turning the edges of the tube inwardly over the die and placing end pieces 38 and 40 over the inwardly turned edges to form a one-to-one lap welded arrangement. The tube, in the present instance, has two slits rather than one as shown in said '819 patent. A row of baffle elements 12 are then attached. The baffle elements 12 are strung upon a jig 42.

The jig 42 is formed as a long, relatively thin strip of metal having a series of circular holes 44 along its length at which ring dies 46 are mounted as by set screw 48. The ring dies have flat circular surfaces to make the welds along the lines 28 (FIGS. 1 and 2) in a manner to be hereinafter described. The ring die is significantly thicker than the jig 42 so that it projects both above and below as shown in FIGS. 5 and 6.

The baffle elements 12 are strung upon the jig 42, corresponding in number to the number of baffle elements in the row. The jig 42 enters between and exits through the plies 18 and 20 of the baffle elements via the notches 22 or 24. Depending upon the bag design, the initially flat baffle elements may or may not overlap.

Each baffle element 12 is located on the jig 42 by the aid of a circular register 50 located at the center of the corresponding ring die. The register 50 is generally circular and about half the diameter of the die. The register 50 is mounted as by a screw 52 upon a cross piece 54 that extends diametrically of the die, the cross piece 54 being located so that the register 50 projects upwardly beyond the plane of the ring (FIG. 6) to enter the opening 26 of the baffle ply, thereby to locate it against sliding along the jig. The register 50 and the cross piece 54 are made of electrical insulation material.

The series of baffle elements so located are positioned in the slitted bag and the bag is positioned on a table 56 (FIG. 7) of a dielectric heating machine 58. The jig is positioned so that each baffle element and corresponding floating ring die 46 falls between a corresponding pair of cylindrical die members 60 and 62. The lower die member 60 is mounted on the bed 64 of the heating machine, and projects upwardly through an access opening in the table 56, while the upper die member 62 is attached to the head 66 of the machine. The top surface of the lower die member 60 is about flush with the surface of the table 56 so as not to interfere with the bag while it is shifted into proper position. When the head 66 closes, the upper bag layer 14 and the upper baffle element layer 18 are clamped between the upper die member 62 and the upper end of the floating ring die 46, while the lower bag layer 16 and the lower baffle element layer 20 are clamped between the lower end of the floating ring die 46 and the lower die member 60. The die members 60 and 62, as well as the floating ring die 46, are electrically conductive, forming plates of electrical capacitors in series. As a high frequency electrical potential is applied between the die members, heat is generated in the dielectric materials between the plates, namely, the plastic of the bag and baffle element. Heat welding results.

When the welding is completed, the head 66 of the welding machine separates. The jig 42 is now carefully withdrawn from the baffle elements. To facilitate the withdrawal, the side edges of the jig 42 are smoothly contoured around the die locations. Removal is easily accomplished by turning the jig 42 about 90° before withdrawal so that the jig cams the baffle plies apart for easy release.

The process is repeated until all the rows of baffles are positioned. Finally, the slits 34 and 36 of the bag are closed using a separator (not shown) removable through the fill hole as in said U.S. Pat. No. 3,753, 819. A 100% lap welded bag results.

Intending to claim all novel, useful and unobvious features shown or described, I make the following claims:

1. A method of making a waveless waterbed bag which comprises:
   (a) forming a tube by partially lap welding the ends of sheet material together, leaving an intermediate access slit;
   (b) lap welding generally rectangular end pieces at opposite openings of the tube;
   (c) threading a jig through a plurality of two-layer hollow baffle elements, with each baffle element encompassing one of a series of floating die elements attached to the jig;
   (d) extending the jig and baffle elements thereon into the bag through said access slit;
   (e) aligning the floating die elements of the jig with die members of a welding machine;
   (f) closing the welding machine die members on the jig;
   (g) generating dielectric heat to weld the baffle elements to the top and bottom layers of the bag;
   (h) withdrawing the jig from the bag and the welded baffle elements; and
   (i) thereafter completing the lap welding of the tube.

2. A method of making a waveless waterbed mattress bag which comprises:
   (a) forming a tube by partially lap welding a pair of substantially rectangular sheets of weldable plastic material together, leaving intermediate slits at opposite sides of the tube for access to the interior of the tube;
   (b) lap welding generally rectangular end pieces at the opposite openings of the tube;
   (c) placing a plurality of two-layer hollow baffle elements to be welded on an elongated jig with each baffle element encompassing a floating die element;
   (d) extending the jig and baffle elements thereon through the bag;
   (e) aligning the floating die elements of the jig with die members of a welding machine;
   (f) closing the welding machine die members on the jig and generating dielectric heat to weld the baffle elements to the top and bottom layers of the bag;
   (g) withdrawing the jig from the bag, leaving the baffle elements in position; and
   (h) thereafter completing the lap welding of the tube.

3. A method of making a waveless waterbed bag which comprises:
   (a) forming a tube by partially lap welding the ends of sheet material together, leaving an intermediate access slit between end openings of the tube;
   (b) lap welding generally rectangular end pieces over the edges at opposite openings of the tube;
   (c) repetitively, until rows of baffle elements are formed,
      i. threading a jig through a plurality of two-layer hollow baffle elements made as a pair of substantially circular pies peripherally welded together and notched at opposite sides;
      ii. registering each baffle element with one of a series of floating die elements carried by the jig;
      iii. extending the jig and baffle elements thereon into the bag through said access slit;
      iv. aligning the floating die elements of the jig with die members of a dielectric welding machine;
      v. closing the welding machine die members on the jig while generating dielectric heat to weld the baffle elements to the top and bottom layers of the bag to form a baffle row;
      vi. withdrawing the jig from the bag and welded baffle elements; and
   (d) finally completing the lap welding of the tube to complete the enclosure of the bag.

4. In apparatus for making a waveless waterbed mattress bag:
   (a) a dielectric welding machine having a plurality of pairs of die members, each of the die members having a circular ring part opposed to the ring part of the companion die member of the pair;
   (b) a jig having a plurality of floating die members arrayed to correspond to the array of said die members, each of said floating die members having substantially circular ends projecting beyond opposite sides of the jig member; and
   (c) a register for each of the floating die members cooperable with a companion register of a hollow baffle element through which said jig is threaded, said register being made of electrical insulation material.

* * * * *